United States Patent [19]

Cloud et al.

[11] 3,956,506

[45] May 11, 1976

[54] JUNIOR CEREAL AND PROCESS

[75] Inventors: Larry L. Cloud; Vincent J. Kelly; Wayne J. Smalligan, all of Fremont, Mich.

[73] Assignee: Gerber Products Company, Fremont, Mich.

[22] Filed: Mar. 26, 1975

[21] Appl. No.: 562,380

[52] U.S. Cl................................. 426/28; 426/621; 426/639
[51] Int. Cl.² ........................................ A23L 1/10
[58] Field of Search ............ 426/28, 457, 462, 560, 426/619, 621, 622

[56] References Cited
UNITED STATES PATENTS

| | | | |
|---|---|---|---|
| 2,339,419 | 1/1944 | McKay | 426/28 |
| 2,853,388 | 9/1958 | Kiely et al. | 426/619 |
| 3,506,447 | 4/1970 | Billerbeck et al. | 426/639 |
| 3,620,761 | 11/1971 | Spring | 426/619 |
| 3,704,134 | 11/1972 | Ronai et al. | 426/619 |
| 3,887,714 | 6/1975 | Kelly et al. | 426/72 |

*Primary Examiner*—Raymond N. Jones
*Attorney, Agent, or Firm*—Townsend and Townsend

[57] ABSTRACT

A process for preparing a nutritious instant infant cereal having a coarse texture, substantially free of other than specific grain cereals and various desirable food supplements. The process is accomplished by subjecting a protein-rich slurry to heating under elevated pressure and temperature.

12 Claims, No Drawings

JUNIOR CEREAL AND PROCESS

BACKGROUND OF THE INVENTION

1. Field of the Invention

Among the many convenience foods are the so-called instant or precooked varieties. Included in this group of convenience foods are the instant cereals that do not require cooking but are prepared ready-to-eat by the addition of water in a prescribed amount. Among such instant cereals are those that have heretofore been employed for infant feeding. Because of their smooth homogeneous nature, such products suffer from the shortcoming that when the infant reaches a more discernible age, such as about six months, the lack of a mouth feel in the reconstituted cereal product makes such cereals less desirable.

2. Description of the Prior Art

Various procedures have been developed for producing precooked cereals, such as illustrated by U.S. Pat. 1,990,329. In addition, procedures have heretofore been utilized to create adult cereals exhibiting a coarse texture, such as by utilizing edible ingredients of a different consistency. For example, U.S. Pat. Nos. 2,999,018 and 3,704,134 add rolled oats to an edible polysaccharide gum or an edible pregelatinized starch component. Similarly, copending U.S. Patent application Ser. No. 422,481, filed Dec. 6, 1973 for "Junior Cereal", provides for the combination of a pregelatinized base flake with quick cooking cereal flakes to provide an infant cereal with mouth feel. Still further, U.S. Pat. No. 3,506,447 represents an alternative process for providing greater consumer acceptability for such precooked dehydrated cereal products by incorporating therewith a substantial portion of fruit puree.

SUMMARY OF THE INVENTION

This invention relates to the preparation of a precooked, dehydrated, grain cereal product that is rapidly reconstitutable with liquid to form a coarse textured cereal mass suitable for infant feeding. It has now been discovered that instant-type cereals can be formed that have a coarse texture by modifications in formulation composition and processing prior to conventional drying treatment on a drum dryer.

It has now been found that an infant cereal having more adult mouth feel, yet still being particularly suitable for infant feeding, can be provided by modifications in the concentrations of conventional ingredients and the utilization of unique processing conditions. More particularly, it has been found that by providing for reducing sugars in an amount of from about 12–30 weight percent of the grain cereal slurry and subjecting the novel slurry to sterilization conditions of greater temperature and line pressure, the resulting drum dried product possesses the desired coarse texture, yet remains fully assimilatable by an infant between six months and two years of age.

In one embodiment, the new product is made from a slurry having a significantly higher malt concentration than that heretofore employed in this industry. More particularly, a malt concentration in excess of 3% by weight, such as 3–7% by weight is preferred. Essential to this embodiment is to first subject such a modified cereal slurry to starch hydrolysis through the use of malt enzyme (diastase) digestion at 140°F–160°F for 10 to 30 minutes in order to convert at least part of the starch to reducing sugars, 12–30%, preferably 18–24%. Other diastatic enzymes that appear to be useful for starch reduction include the mixture of α-amylase and β-amylase from fungal, bacterial or animal sources.

In a second embodiment, dextrose is added to the initial slurry ingredients in an amount sufficient to provide the aforementioned concentration of reducing sugar. Under these conditions, starch hydrolysis can be eliminated or at least minimized.

In either embodiment, it has been found to be essential to heat the resulting slurry to 200°F–308°F, preferably 240°F–270°F, while applying a line pressure of more than 30 p.s.i.g., preferably 35–55 p.s.i.g., while holding the heated slurry under these conditions of temperature and pressure for at least 10 seconds, preferably 45 seconds. It has been found that the resulting drum dried product can be reconstituted to have a mouth feel heretofore unobtainable by conventional techniques.

It has been found to be particularly preferred to employ a temperature in the range of 240°–270°F at a line pressure of about 50 p.s.i.g. for approximately 45 seconds to optimize the results.

In a preferred aspect, it has been found desirable to control the fat level of the novel reconstitutable product in the range of above 6% by weight, more preferably 7–9% by weight. With respect to protein level, it has been found necessary in forming the product of this invention to adjust protein level to at least 17% and preferably 17–19% by weight.

In still another aspect of the invention, the use of up to 10% of a high protein material, such as soya flour, in combination with a slurry of at least one cereal grain has been found to further enhance the texture of the reconstituted product. It has been found that when the concentration of soya flour is increased so that the protein content of the cereal is at least 25%, with the obvious decrease in the other cereal ingredients, here again the initial step of enzyme hydrolysis is not necessary. Heating such a slurry under the aforementioned conditions of temperature and pressure (200°F–308°F, 30–55 p.s.i.g.) for about 45 seconds produces the desired toddler texture.

DESCRIPTION OF THE SPECIFIC EMBODIMENTS

An infant cereal of the instant type is provided that, upon reconstitution with water (or milk or formula), retains a desired coarse texture and desirable flavor for the toddler age infant. While various grains can be employed, oat and wheat are the most popular grains for instant cereals. However, any cereal grain flour normally employed in this art, for example, rice, corn, barley and the like, and mixtures thereof, may be employed in the practice of this invention.

The pregelatinized instant cereal flake of this invention will normally be made from appropriate cereal flour and various mineral supplements. Salts, such as calcium sulfate, calcium phosphate or calcium carbonate, and other minor additives including vitamins, electrolytic iron, phosphatides, e.g., lecithin, and the like may be included. Optionally, a minor amount of a fruit puree may be added, such as bananas, prunes, strawberries, apples and the like, or imitation flavors may be incorporated. Still further, dried fruit can be physically blended with the dried mixture.

Conveniently, a mixture containing 80–95 weight percent of the appropriate grain cereal flour or flours, from 1–5 weight percent, more conveniently from about 2–4 weight percent of a mineral supplement such as calcium sulfate, and from about 3.0–7.0 weight percent of malt are mixed. In addition, minor amounts of food supplements may be added, normally being in the range of from about 0.1–2 weight percent in total amount, individual amounts varying from 0.01–0.5 weight percent.

The dry mixture may then be slurried with from about 2.5–10.0 times its weight of water to provide a slurry. The slurry is then heated in the range of about 140°–160° F, in conventional equipment such as atmospheric, vacuum, or pressure cooking tanks. The time employed is necessarily sufficient to insure the hydrolysis of the cereal slurry. A temperature of about 160°F is that required to inactivate starch enzymes.

The slurry is thereafter subjected to additional heating, for example, in a tangential heater, under a pressure of more than 30 p.s.i.g. The secondary high temperature, pressurized heating not only accomplishes sterilization and deactivation of the enzymes, but apparently creates the slurry conditions which ultimately result in a coarse texture when the dehydrated product is ultimately rehydrated.

The object of dehydrating is to remove as much of the water present in the slurry as possible without detrimentally affecting its quality. Therefore, the final products envisioned by this invention usually contain at least 90% solids and preferably from 95–98% solids. Drying is accomplished by any of the readily available conventional equipment, such as single or double drum dryers, well known in the art. The dehydrated base material can be removed from the drying surface as a continuous sheet, usually having a thickness of about 4–7 mils. The particles may then be flaked in accordance with the size desired.

When using such drum dryers, the film thickness will obviously be dependent on the spacing between the drums, the drum speed, the type of slurry being treated and the steam pressure in the drums. The steam pressure can be advantageously employed in the range of 30–90 p.s.i.g., with specific conditions dependent upon slurry composition and volume. It has been found that an optimum product is obtained when a drying means, especially double drum dryers, are run at high drum temperature and drum pressure. However, none of these factors will deter the coarse texture of the final product resulting from the high pressure in-line heating.

The dried cereal may be prepared for packaging and ultimate consumption by flaking into various sizes. The flaking is accomplished with standard equipment such as a U.S. sieve series screen having 0.25–1.0 inch openings, preferably 7/16 inch openings. Further, variations in flake size can be accomplished by varying flaker speed. It is within the scope of this art to employ tension or draw-off rollers in conjunction with the drum dryers if desired.

When the cereal slurry is subjected to sterilization line back-pressures in excess of 30 p.s.i.g., the desired coarse texture is produced. The data set forth in the following table, demonstrates product texture with variations in sterilization line back-pressure.

TABLE I

| | | STERILIZATION LINE BACK-PRESSURE (OATMEAL) | | |
|---|---|---|---|---|
| % Malt | Slurry % Solids | Line Temperature | Line Back-Pressure | Texture |
| 6 | 16 | 230°F | 10 lbs. | Poor |
| 6 | 16 | 230°F | 30 lbs. | Poor |

TABLE I-continued

| | | STERILIZATION LINE BACK-PRESSURE (OATMEAL) | | |
|---|---|---|---|---|
| % Malt | Slurry % Solids | Line Temperature | Line Back-Pressure | Texture |
| 6 | 16 | 230°F | 40 lbs. | Good |
| 6 | 16 | 230°F | 50 lbs. | Very Good |
| 6 | 16 | 230°F | 60 lbs. | Poor |

Additionally, by increasing the normal malt percentage in products of this type beyond the conventional 1–2% by weight, the resulting reconstituted product has been found to exhibit the desired texture without adverse effect upon other characteristics. In particular, it has been found that malt concentration in the range of 3–7 weight percent is essential, in conjunction with the aforementioned sterilization line pressure, to accomplish the result desired. Data demonstrating the effect of malt concentration (in percent) on texture is provided below in Table II.

TABLE II

| | | ENZYME CONCENTRATION | | |
|---|---|---|---|---|
| % Malt | Slurry % Solids | Line Temperature | Line Back-Pressure | Texture |
| 1–2 | 16 | 230°F | 50 lbs. | Poor |
| 3 | 16 | 230°F | 50 lbs. | Good |
| 4 | 16 | 230°F | 50 lbs. | Good |
| 5 | 16 | 230°F | 50 lbs. | Very Good |
| 6 | 16 | 230°F | 50 lbs. | Very Good |
| 7 | 16 | 230°F | 50 lbs. | Very Good |
| 8 | 16 | 230°F | 50 lbs. | Poor |
| 10 | 16 | 230°F | 50 lbs. | Poor |

In order to demonstrate the subject invention, the following examples are offered by way of illustration and not by way of limitation.

EXAMPLE I - OATMEAL CEREAL

In a dry ingredient blender were mixed 100 pounds of oat flour, 5 pounds of malted barley flour, 1.6 pounds of calcium sulfate, 1.5 pounds of vanilla sugar, 0.25 pounds of vitamin mix (containing niacinamide, riboflavin, pyridoxine hydrochloride, and thiamine mononitrate) and 0.06 pounds of electrolytic iron. The blended ingredients were then passed through a finisher wherein 60 gallons of water were slurried therewith.

The slurry was heated for about 20 minutes at 140° F in a cook tank and thereafter transferred through a tangential heater maintained at 240° F wherein the slurry was subjected to a sterilization line pressure of 50 p.s.i.g. The pressure was accomplished by providing a girdler valve within the sterilization line and adjusted to 50 p.s.i.g. The resulting gelatinized sterilized slurry was fed to a conventional double drum dryer, with the drums operating at about 50 p.s.i.g. internal pressure. The drums rotated at four revolutions per minute, and the dried sheets were removed with doctor blades. The sheets were then flaked to the desired size, screened and packaged. The size of the flakes was in the range of 0.25–1.0 inches.

EXAMPLE II - MIXED CEREAL

Starting with a dry mixture of 40 pounds of oat flour, 40 pounds of corn flour, 10 pounds of soya flour, 5 pounds of malted barley flour, 3 pounds of soya oil, 2.2 pounds of calcium sulfate, 0.5 pounds of soya lecithin, 0.35 pounds of vitamin mix (containing niacinamide, riboflavin, pyridoxine hydrochloride, and thiamine mononitrate) and 0.085 pounds of electrolytic iron was subjected to the process recited above for Example I.

EXAMPLE III - MIXED CEREAL

The dry formulation of Example II was blended with rice flakes and soya flakes in the ratio of 75:20:5, respectively.

EXAMPLE IV - OATMEAL CEREAL

In a dry ingredient blender were mixed 270 pounds of oat flour, 18 pounds of soya flour, 18 pounds of malt flour, and 2 pounds of calcium carbonate. The blended ingredients were then passed through a finisher wherein 176 gallons of water were slurried therewith, producing a slurry solids concentration of 15.5%.

The slurry was heated for 17 minutes at 145° F in a cook tank and thereafter transferred through a tangential heater maintained at 250° F wherein the slurry was subjected to sterilization line pressure of 50 p.s.i.g. The resulting sterilized slurry was fed to a conventional double drum dryer operating at a rotation of 4 revolutions per minute and 65 p.s.i.g. internal pressure. The dried sheets were removed with doctor blades and passed through a flaker screen set to provide flakes of approximately 7/16 inch.

EXAMPLE V - MIXED CEREAL

Starting with a dry mixture of oat flour, 120 pounds of corn flour, 30 pounds of soya flour, 18 pounds of malt flour, 9 pounds of soya oil, 1½ pounds of lecithin and 2.5 pounds of calcium carbonate, 185 gallons of water was blended therein and the slurry subjected to the process recited for Example IV.

EXAMPLE VI - OATMEAL CEREAL

In a dry ingredient blender were mixed 75 pounds of oat flour, 25 pounds of dextrose, 1.6 pounds of calcium sulfate, 0.25 pounds of vitamin mix (containing niacinamide, riboflavin, pyridoxine hydrochloride, and thiamine mononitrate) and .06 pounds of electrolytic iron. The blended ingredients were then passed through a finisher wherein 60 gallons of water were slurried therewith.

The slurry was transferred through a tangential heater for treatment as in Example I.

The above-described cereals were prepared for eating by placing one ounce of the cereal in a bowl and adding ½–⅔ cup hot or cold water, milk or formula. Upon addition of water, the instant cereal rapidly reconstituted to a porridge having the desired flavor and coarse texture.

Although the foregoing invention has been described in some detail by way of illustration and example for purposes of clarity and understanding, it will be obvious that certain changes and modifications may be practiced within the scope of the appended claims.

What is claimed is:

1. A method for preparing an instant grain cereal having a coarse texture, which comprises: providing as a slurry, grain cereal flour having from 2.5–10.0 times by weight of water based on solids content, and reducing sugars in an amount of from 12–30 weight percent based on solids content; sterilizing said slurry at a temperature of 200° F – 308 ° F and a pressure in excess of 30 p.s.i.g. for at least 10 seconds; and drying and flaking said sterilized slurry mixture.

2. A method in accordance with claim 1 and further characterized by including in said slurry from 3–7 weight percent malt enzyme based upon solids content, and heating said slurry at a temperature in the range of 140°–160° F for a time sufficient to produce reducing sugars in an amount from 12–30 weight percent based on solids content.

3. A method in accordance with claim 1 and further characterized by initially incorporating in said slurry up to 25% dextrose based on solids content.

4. A method according to claim 1 wherein said cereal is selected from at least one of oats or corn.

5. A process in accordance with claim 4 and further characterized by incorporating 25 parts of rice flakes into each 100 parts of total dry mixture.

6. A process in accordance with claim 5 wherein 5 parts of soya flakes are employed for each 100 parts of total dry mixture.

7. A process in accordance with claim 1 wherein said flaking provides flakes in a size in the range of 0.2–0.5 inches.

8. A process in accordance with claim 1 wherein the dried flakes contain at least 17 weight percent protein.

9. A process in accordance with claim 6 wherein the amount of protein is about 17–19 weight percent.

10. A process in accordance with claim 1 wherein the dried flakes contain at least 6 weight percent fat.

11. A process in accordance with claim 8 wherein the amount of fat is about 7–9 weight percent.

12. A product formed by the process of claim 1.

* * * * *